United States Patent
Krueger

(10) Patent No.: US 8,410,624 B2
(45) Date of Patent: Apr. 2, 2013

(54) WIND ENERGY INSTALLATION WITH VARIABLE ROTATION SPEED CHARACTERISTIC

(75) Inventor: Thomas Krueger, Westerroenfeld (DE)

(73) Assignee: REpower Systems AG, Hamburg (DE)

( * ) Notice: Subject to any disclaimer, the term of this patent is extended or adjusted under 35 U.S.C. 154(b) by 301 days.

(21) Appl. No.: 12/855,471

(22) Filed: Aug. 12, 2010

(65) Prior Publication Data

US 2011/0037262 A1 Feb. 17, 2011

(30) Foreign Application Priority Data

Aug. 12, 2009 (DE) .......................... 10 2009 037 238

(51) Int. Cl.
*F03D 9/00* (2006.01)
*H02P 9/04* (2006.01)

(52) U.S. Cl. ........................................... 290/44; 290/55

(58) Field of Classification Search .................... 290/44, 290/55; 322/44
See application file for complete search history.

(56) References Cited

U.S. PATENT DOCUMENTS

| | | | |
|---|---|---|---|
| 4,461,957 A * | 7/1984 | Jallen .............................. | 290/44 |
| 7,504,738 B2 * | 3/2009 | Barton et al. ................... | 290/44 |
| 7,839,008 B2 * | 11/2010 | Woldmann et al. ............. | 290/44 |
| 8,021,112 B2 * | 9/2011 | Dinjus et al. ..................... | 416/1 |
| 8,046,109 B2 * | 10/2011 | Larsen et al. .................. | 700/293 |
| 8,084,875 B2 * | 12/2011 | Letas .............................. | 290/44 |
| 2007/0069522 A1 | 3/2007 | Barton et al. | |
| 2008/0252076 A1 * | 10/2008 | Fortmann et al. ............... | 290/44 |
| 2009/0322086 A1 * | 12/2009 | Letas .............................. | 290/44 |
| 2010/0001527 A1 * | 1/2010 | Fortmann et al. ............... | 290/44 |
| 2010/0142237 A1 * | 6/2010 | Yuan et al. ....................... | 363/97 |
| 2010/0283247 A1 * | 11/2010 | Krueger .......................... | 290/44 |

* cited by examiner

*Primary Examiner* — Hae Moon Hyeon
(74) *Attorney, Agent, or Firm* — Morrison & Foerster LLP

(57) ABSTRACT

A wind energy installation including a wind rotor, a doubly-fed asynchronous generator driven by the wind rotor, a converter, and a controller configured to determine an operating torque for an operating rotation-speed, the operating torque not exceeding a maximum torque. The installation also includes a frequency-adaptive torque limiter having a classifier—for an overfrequency or underfrequency, a torque shifter configured to reduce the maximum torque in the event of frequency discrepancies, and an inhibitor configured to block the torque shift at an underfrequency. The installation further includes a frequency-dependent rotation-speed limiter configured to interact with the classifier such that a lower limit rotation-speed is increased only at an overfrequency and an upper limit rotation-speed is reduced only at an underfrequency. Accordingly, the operating torque can be adapted with respect to the permissible limit values rather than over the entire operating range, thus minimizing yield losses when frequency discrepancies occur.

7 Claims, 3 Drawing Sheets

WIND ENERGY INSTALLATION WITH VARIABLE ROTATION SPEED CHARACTERISTIC

REFERENCE TO RELATED APPLICATIONS

This application claims the priority of German Patent Application No. 10 2009 037 238.5, filed Aug. 12, 2009, the contents of which are incorporated herein by reference.

FIELD OF THE INVENTION

The invention relates to a wind energy installation having a wind rotor, a doubly-fed asynchronous generator which is driven by the wind rotor and, having a converter, which comprises a generator-side inverter and a grid-side inverter, as well as a controller which is designed to determine an operating torque for an operating rotation-speed, with the operating torque not exceeding a maximum torque, and which furthermore has a grid frequency detector.

BACKGROUND OF THE INVENTION

Modern wind energy installations are designed for variable rotation speeds and, for this purpose, are provided with a converter. Normally, they have a doubly-fed asynchronous generator, whose stator is permanently connected to the grid, and the rotor is connected to the grid via the converter. This allows the generator to be operated not only at a rotation-speed which corresponds to the grid frequency but also at a lower rotation-speed than that corresponding to the grid frequency (or the synchronous rotation-speed that is governed by it), or operation at a higher rotation-speed than that corresponding to the synchronous rotation-speed. The respective discrepancy between the actual rotation-speed and the synchronous rotation-speed, which is governed by the grid frequency, is referred to as slip. Slip values of ±30%, or in some cases even more, are normal for modern wind energy installations. The wind energy installation can therefore be operated over a wide rotation-speed range.

The synchronous rotation-speed, which is critical for determining the slip, is not constant during practical operation on the actual grid, but is subject to the same fluctuations as the grid frequency. For example, when an overfrequency occurs in the grid, then the synchronous rotation-speed is correspondingly shifted upwards, and vice versa. If the slip values in consequence become too high or too low, then there is a risk of overloading and of damage to components of the wind energy installation. Various remedial areas to avoid this are known from the prior art.

A first measure is to base the design of the components of the wind energy installation on the respectively worst extreme case, that is to say to take account of the maximum permissible grid frequency discrepancy. In the end, this leads to planned overengineering of the components, and is therefore correspondingly expensive, in terms of production costs. Furthermore, when the characteristics are matched to the worst case, this leads to sub-optimum operation at the nominal frequency, resulting in yield losses. In addition, this design based on the extreme case is still completely inadequate and, furthermore, the steady-state rotation-speed range must be matched to the grid frequency in order to prevent overloading in the event of excessive rotor slip, in particular in the event of a relatively heavy load, when an actual underfrequency occurs.

US 2007/069522 A1 discloses a different approach for the adaptation of the characteristics. The grid frequency is measured in order to determine whether an overfrequency or underfrequency situation exists, in order to shift the rotation-speed/torque characteristics toward the synchronous point, as a function of this. This reduces the slip that actually occurs. The entire characteristic is therefore adapted as a function of the actual grid frequency. This has the disadvantage that this adaptation acts over the entire operating range, which can likewise result in yield losses as a result of unnecessary reduction, as already described above for the static design based on the extreme case. Furthermore, this results only in inadequate protection for certain operating states, for example for the combination of overfrequency and high load.

Adequate protection cannot be ensured in particular for this critical operating situation.

SUMMARY OF THE INVENTION

Against the background of the prior art cited immediately above, the invention is based on the object of specifying an improved wind energy installation and an operating method which reduces the disadvantages mentioned above.

The solution according to the invention resides in the features broadly disclosed herein. Advantageous developments are the subject matter of the detailed disclosure.

In the case of a wind energy installation having a wind rotor, a doubly-fed asynchronous generator which is driven by the wind rotor and, having a converter, which comprises a generator-side inverter and a grid-side inverter, as well as a controller which is designed to determine an operating torque for an operating rotation-speed, with the operating torque not exceeding a maximum torque, the invention provides a frequency-adaptive torque limiter having a classifier for an overfrequency or underfrequency outside of a tolerance band, a torque shifter, which is designed to reduce the maximum torque in the event of frequency discrepancies, and an inhibitor, which blocks the torque shift at an underfrequency, and as well as a frequency-dependent rotation-speed limiter to whose input a signal for the frequency discrepancy is applied and which interacts with the classifier such that the lower limit rotation-speed is increased only at an overfrequency, and the upper is reduced only at an underfrequency.

The invention is based on the idea of not adapting the operating torque over the entire operating range, but of carrying out the adaptation only with respect to the permissible limit values, in particular the maximum value, but with this adaptation not being carried out statically, but dynamically as a function of the actually occurring frequency discrepancy. This makes it possible to link the previously contradictory advantages of the previously known solution options, and therefore to reduce their respective disadvantages. In particular, dynamic limiting avoids the disadvantage of yield losses always occurring, such as those which have previously unavoidably occurred in the past when designing for the worst case. Since only the limit value and not the entire characteristic is shifted over the entire operating range, the losses can be further reduced.

The invention operates in two ways. On the one hand, the permissible rotation-speed range is matched to the respective change in the grid frequency. This ensures that the permissible operating range of the converter is not departed from. When an overfrequency occurs, the lower limit of the permissible rotation-speed range is therefore increased, in order to keep the slip within the operating limits of the converter. There is no need to change the maximum limit of the permissible operating range, since lower slip values occur here in any case when an overfrequency occurs. Correspondingly, when an underfrequency occurs, the maximum limit of the permissible rotation-speed range is changed, to be precise by reducing it to such an extent that the maximum slip is not undershot. In practice, this is expediently done by implementing the reduction in proportion to the grid frequency discrepancy. The minimum rotation-speed of the permissible rotation-speed range does not need to be adapted, since lower slip values would occur here in any case in the event of an underfrequency. This restriction to the change of in each case only one maximum limit on the one hand provides protection against unacceptably high values when corresponding extreme operating conditions occur while, on the other hand, the manner of operation remains unchanged in the normal state. There is therefore no need to be concerned about yield losses during normal operation.

The second aspect consists in adaptation of the torque limit of the additional permissible rotation-speed range, to be more precise the maximum permissible torque, in addition to adaptation of the permissible rotation-speed range. The torque shifter is provided for this purpose. This varies the maximum permissible torque as a function of the actual rotation-speed and the determined overfrequency. This means that the slip-dependent maximum permissible torque is not overshot even when overfrequencies occur. According to the invention, when an underfrequency occurs, the adaptation is blocked by the inhibitor, in order to prevent the maximum torque being raised at an underfrequency, which could lead to overloading of other components. This means that, in this case, deliberately asymmetric adaptation is implemented, specifically only when an overfrequency occurs, but that no adaptation is implemented when an underfrequency occurs. Since, once again, only the maximum value is influenced, not operation during normal conditions, the invention means that there are no yield losses in comparison to normal operation.

The torque shifter preferably interacts with a rotation-speed modifier, which is designed to generate a modified rotation-speed signal, which is changed by a correction value that is dependent on the frequency discrepancy, from the actual operating rotation-speed, and which modified rotation-speed signal is applied to a rotation-speed-dependent maximum torque element which emits the maximum torque. This is particularly suitable for embodiments in which the maximum permissible torque is determined as a function of the rotation-speed, for example by means of a look-up table or a characteristic element. In order to avoid a change to the table or characteristic element, which could involve considerable cost for programming and adaptation, the intrinsically unchanged characteristic element or the table has a changed (modified) rotation-speed signal applied to it. In this case, the rotation-speed signal is modified as a function of the frequency discrepancy. When the frequency is at the nominal value, the rotation-speed signal is then not changed; in the event of a frequency discrepancy in the form of an overfrequency, the rotation-speed signal is correspondingly reduced, and when an underfrequency occurs, it is correspondingly increased. This artifice results in the modified rotation-speed signal corresponding to that rotation-speed (or frequency) which has to be compensated for by the converter as the difference between the actual rotation-speed of the rotor and the synchronous rotation-speed, as defined by the instantaneous grid frequency. Therefore, the converter is not only utilized optimally independently of the grid frequency, but is also protected against overloading.

The rotation-speed modifier advantageously has an input for a maximum permissible frequency, and a saturation element is provided which limits the rotation-speed modification to the maximum permissible frequency. This prevents overadaptation, which could lead to damage to other components in the installation. In this case, the saturation element is expediently designed such that a value for the rated frequency is applied as the lower limit, and a value for the maximum permissible grid frequency is applied as the upper limit.

The classifier is preferably designed to inhibit the rotation-speed modification at full load. At full load, there is essentially a risk of overloading, except in extraordinary operating conditions such as excessive rotation speeds in the event of gusts. Inhibiting in this way therefore makes it possible to ensure that the full yield is achieved at full load.

It is also possible to design the rotation-speed modification element to form the modified rotation-speed signal from the real rotation-speed, using the ratio of the nominal grid frequency to the actual grid frequency, and possibly taking into account the saturation element. The rotation-speed can therefore be modified in a particularly simple and expedient manner.

The invention furthermore relates to a corresponding method. Reference is made to the above statements for a more detailed explanation.

BRIEF DESCRIPTION OF THE DRAWINGS

The invention will be explained in more detail in the following text using exemplary embodiments and with reference to the drawings, in which.

DETAILED DESCRIPTION OF THE INVENTION

Figure 1:
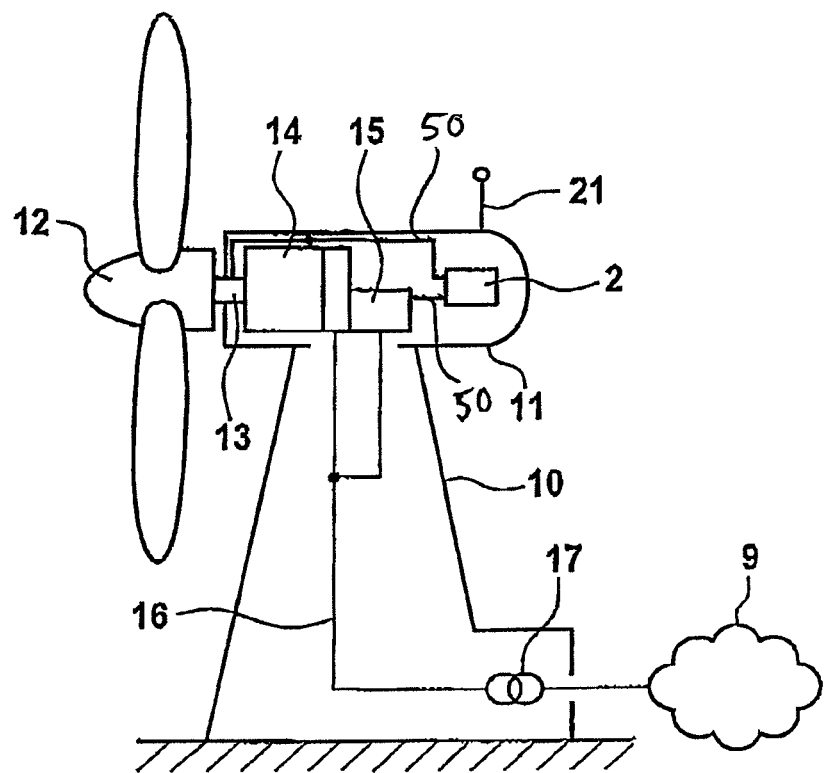
FIG. 1 shows an overview illustration of a wind energy installation according to one exemplary embodiment of the invention.

The wind energy installation has a tower 10 at whose upper end a pod 11 is arranged such that it can swivel in the azimuth direction. A wind rotor 12 is arranged, such that it can rotate, on an end face of the pod 11 and, via a rotor shaft 13, drives a generator which is designed to convert mechanical energy to electrical energy. In the illustrated exemplary embodiment, this is a doubly-fed asynchronous generator 14, which interacts with a converter 15. The electrical power produced by the generator 14 with the converter 15 is emitted via a connecting line 16 to a transformer 17, which is arranged at the foot of the tower 10 of the wind energy installation. This is connected to a distribution grid 9, which may be an internal grid for a wind farm, or a public power transmission grid.

Furthermore, a controller 2 is arranged on the pod 11, is connected via signal lines 50 to the various components of the wind energy installation, and controls them. In turn, control signals are applied to the controller 2, with these control signals being obtained via a cable-based or wire-free connecting link 21 from a superordinate control entity, in particular a wind farm control system or a grid control center of a power supply company. The controller 2 is designed to define the operating point of the wind energy installation, at which the wind energy installation is operated, depending on the prevailing environmental conditions, in particular the wind speed. In particular, this includes the functionality of determining the torque T as a function of the instantaneous rotation-speed and of passing this as an electrical nominal torque via the converter 15 to the generator 14. A further functionality is to determine a maximum permissible torque $T_{max}$, as a function of the rotation-speed.

In the case of asynchronous generators of the doubly-fed type, such as those used in the illustrated exemplary embodiment, a slip s occurs during operation. This slip depends on the actual rotation-speed n of the generator 14 and on a so-called synchronous rotation-speed $n_{sync}$, which results from the speed of revolution of the field, which revolves at the grid frequency. This slip is the magnitude of the rotation-speed discrepancy from the synchronous rotation-speed, divided by the synchronous rotation-speed:

$$s = \frac{n - n_{sync}}{n_{sync}}$$

In this case, n is the actual (mechanical) rotation-speed of the generator 14, and $n_{sync}$, is the synchronous rotation-speed which results from the grid frequency. When the wind energy installation is being operated at a rotation-speed below the synchronous rotation-speed, then this is referred to as subsynchronous operation; in contrast, when the wind energy installation is being operated at a rotation-speed above the synchronous rotation-speed, this is referred to as supersynchronous operation.

The dependency of the synchronous rotation-speed $n_{sync}$ on the grid frequency if means that the synchronous rotation-speed likewise changes when the grid frequency changes. A grid frequency above the rated frequency (overfrequency) therefore leads to the synchronous rotation-speed rising, and therefore to the slip decreasing when the mechanical rotation-speed remains constant in the supersynchronous range, while in contrast the slip increases during subsynchronous operation. The opposite situation occurs when the grid frequency falls to a value below the rated frequency (underfrequency). The corresponding reduction in the synchronous rotation-speed when the mechanical rotation-speed is constant during supersynchronous operation leads to an increase in the slip, while the slip decreases during subsynchronous operation.

The controller 2 has an element 22 for determining a nominal torque T relating to the mechanical rotation-speed n, and a limit torque determining means 23, which determines a respective maximum permissible torque $T_{max}$ relating to an applied signal for an actual rotation-speed $n_i$. This determining means may be in the form of an algebraic function, preferably a look-up table (LUT) or a characteristic element. In the illustration shown in FIG. 2, a look-up table (LUT) is provided for the determining means 23. A function as illustrated by a solid line in FIG. 3 is implemented in it. As can be seen, one value for the maximum permissible torque $T_{max}$ is in each case assigned for each rotation-speed n between the minimum operating rotation-speed $n_{min}$ of the wind energy installation and the maximum operating rotation-speed $n_{max}$. The profile of the maximum torque $T_{max}$, which results in this case has a knee point at the synchronous rotation-speed $n_{sync}$.

Figure 2:
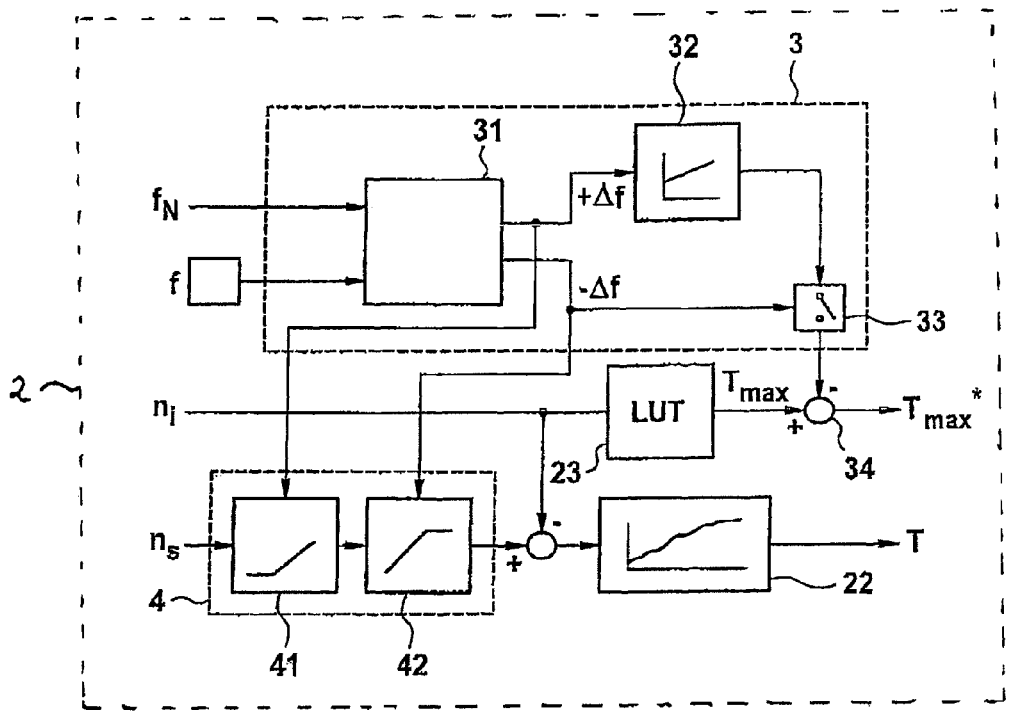
FIG. 2 shows a block diagram for the control of a wind energy installation as shown in FIG. 1.
Figure 3:
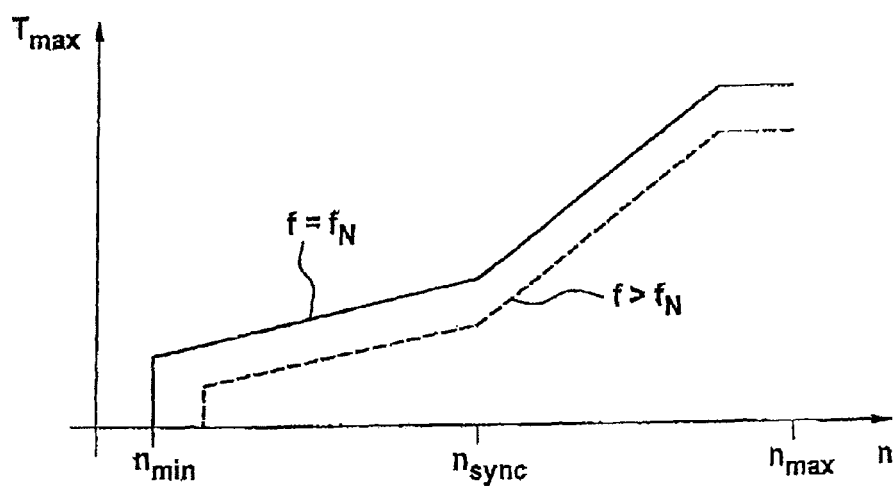
FIG. 3 shows a rotation-speed/torque diagram of the wind energy installation as shown in FIG. 1.

Reference will now be made to FIG. 2 which, in addition to the maximum torque determining means 23, which is known per se, illustrates a frequency-adaptive limiting device 3 according to the invention. This comprises a classifier 31, to which input signals are applied for the nominal frequency $f_N$ of the grid 9, as well as the measurement signal from a grid frequency detector for the actually prevailing frequency f. The classifier 31 is designed to use these signals to emit a positive frequency discrepancy signal $+\Delta f$ in the event of an overfrequency, and a negative discrepancy signal $-\Delta f$ when a negative frequency discrepancy occurs. The positive discrepancy signal $+\Delta f$ is applied to the input of a torque shift 32, which is designed to determine a maximum torque correction value $\Delta T_{max}$, which is emitted as an output signal, as a function of the frequency discrepancy when an overfrequency occurs. This signal is applied to a summation element 34 with a negative mathematical sign via an inhibitor 33, which is closed in the normal state. The maximum torque $T_{max}$ determined by the maximum torque determining means 23 is therefore reduced by the torque correction value $\Delta T_{max}$ determined by the torque shift 32, thus forming a modified maximum value $T_{max}*$. In contrast, when the classifier 31 finds that an underfrequency has occurred, the inhibitor 33 is operated via the output signal that is correspondingly emitted by the classifier 31. A change in the value of the maximum torque $T_{max}$ is therefore blocked, such that no adaptation takes place in the event of an underfrequency. The torque of the generator/converter system 14, 15 is therefore restricted in the event of an overfrequency, but the maximum permissible torque remains unchanged when an underfrequency occurs.

A frequency-dependent rotation-speed limiter 4 is also provided. This comprises a lower branch 41 and an upper branch 42. Once again, the signals determined by the classifier 31 for positive frequency discrepancies and negative frequency discrepancies, $+\Delta f$ and $-\Delta f$, are applied to its inputs. The signal for positive frequency discrepancies is in this case applied to the lower limiter module 41, but not to the upper limiter 42. This means that the lower limit for the nominal rotation-speed is increased when an overfrequency occurs, and the upper limit for the nominal rotation-speed $n_{max}$ remains unchanged. In contrast, the discrepancy signal for an underfrequency is applied exclusively to the upper limiter module 42, as a result of which the upper limit for the nominal rotation-speed $n_{max}$ is reduced when an underfrequency occurs, and the lower limit for the nominal rotation-speed $n_{min}$ remains unchanged when an underfrequency occurs.

This means that the steady-state rotation-speed range is adapted when frequency discrepancies occur. When overfrequencies occur, the lower limit $n_{min}$ is therefore increased, thus preventing unacceptably high (negative) slip values from occurring. In this case, the upper rotation-speed limit remains unchanged. Conversely, when underfrequencies occur, the upper rotation-speed limit is reduced. This also means that no unacceptably high (positive) slip values occur. The limiting function which is implemented in the limiter modules 41, 42 is preferably designed such that the nominal rotation-speed $n_s$ is adapted corresponding to the percentage discrepancy between the actual grid frequency and the nominal grid frequency.

Furthermore, the torque shifter 32 and the inhibitor 33 ensure that the permissible torque is reduced when an overfrequency occurs, while the maximum permissible torque is not changed when an underfrequency occurs. This ensures that the slip-dependent torque limit is not overshot even when an overfrequency occurs. The profile of the corresponding characteristic for the maximum torque and rotation-speed after limiting is shown by a dashed line in FIG. 3.

Figure 4:
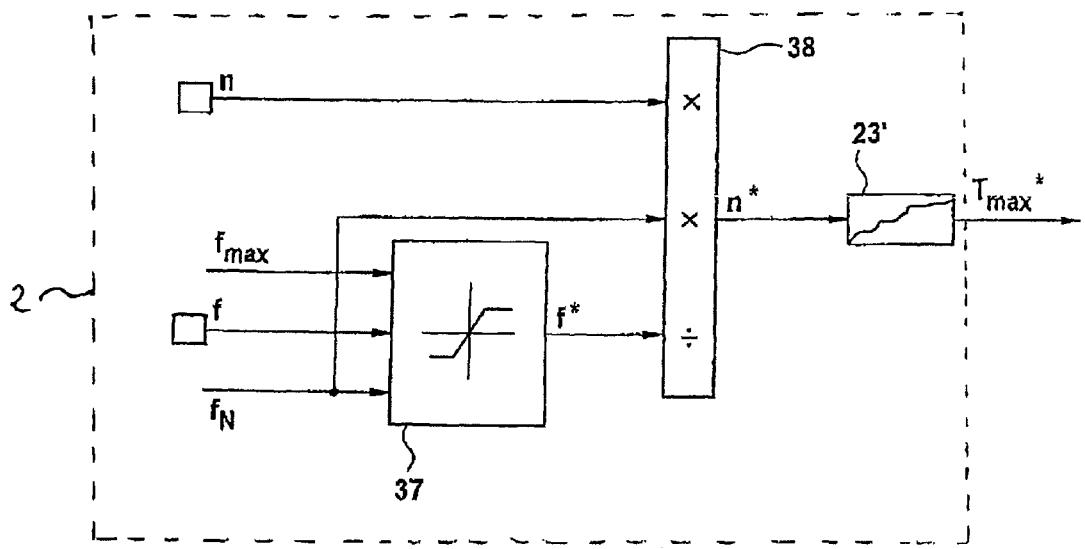
FIG. 4 shows a block diagram for the control according to a second exemplary embodiment.

FIG. 4 illustrates a second exemplary embodiment with the limiting device 3. This is provided with integrated components, to be precise a rotation-speed modification element 38 and a saturation element 37. Input signals for the actual frequency f, as determined by the grid frequency detector, the nominal grid frequency $f_N$—and as a special feature—the maximum permissible grid frequency $f_{max}$ are applied to the input of the saturation element 37. The nominal frequency in this case forms the lower limit value, and the maximum permissible frequency $f_{max}$ forms the upper limit value, of the saturation element 37. The applied measurement signal for the actually prevailing grid frequency f is therefore processed via the saturation element 37, and is emitted as a saturated frequency signal f*. This is applied to a divisor input of the rotation-speed modification element 38. The rotation-speed modification element 38 furthermore has two multiplier inputs. The signal for the nominal frequency $f_N$ is applied to one of the multiplier inputs, and a signal for the actual rotation-speed n of the generator 14 is applied to the other multiplier input. A modified rotation-speed signal n* is now formed by means of the function:

$$n^* = n \times \frac{f_N}{f^*}$$

Figure 5:
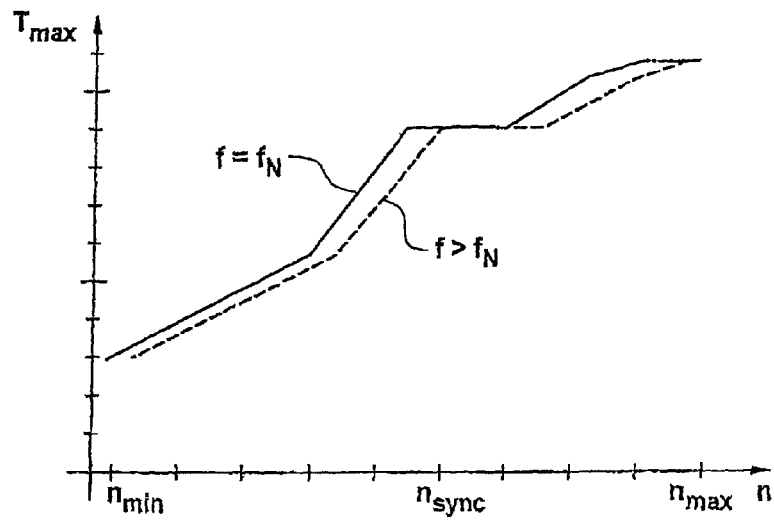
FIG. 5 shows an alternative rotation-speed/torque diagram.

This modified rotation-speed signal is applied to the input of a maximum torque element 23'. This can be designed as described above, or, as in the exemplary embodiment illustrated in FIG. 4, may be in the form of a characteristic element. This emits the associated maximum value for the permissible torque, $T_{max}$ in response to the applied (modified) rotation-speed signal n*. In this embodiment, both functionalities, specifically both rotation-speed limiting and torque limiting, can be achieved in a particularly simple and elegant manner by calculating a synthetic intermediate variable, specifically the modified rotation-speed signal n*. FIG. 5 illustrates one example of a corresponding shift for a relatively complex torque limit characteristic (solid line at the rated frequency and dashed line at overfrequency).

The invention claimed is:

1. A wind energy installation, comprising:
   a wind rotor;
   a doubly-fed asynchronous generator driven by the wind rotor;
   a converter, the generator configured to interact with the converter;
   a controller comprising a frequency-adaptive torque limiter and a frequency-dependent rotation-speed limiter, the controller configured to determine an operating torque for an operating rotation-speed, the operating torque not exceeding a maximum torque; and
   signal lines connecting the controller with the rotor, the generator, and the converter such that the controller controls the rotor, the generator, and the converter,
   the frequency-adaptive torque limiter having a classifier for an overfrequency or underfrequency, a torque shifter configured to reduce the maximum torque in the event of frequency discrepancies, and an inhibitor configured to block the torque shift at an underfrequency, and
   the frequency-dependent rotation-speed limiter configured to interact with the classifier such that the frequency-dependent rotation-speed limiter increases a lower limit rotation-speed of the rotor via the signal lines only at an overfrequency and reduces an upper limit rotation-speed of the rotor via the signal lines only at an underfrequency.

2. The wind energy installation of claim 1, further comprising a maximum torque element in the form of a characteristic element or a look-up table.

3. The wind energy installation of claim 1, further comprising a rotation-speed modification element configured to generate a modified rotation-speed signal, which is changed by the frequency-discrepancy-dependent correction value from the actual operating rotation-speed, and which is applied to a rotation-speed-dependent maximum torque element configured to emit a maximum value for the rotation speed.

4. The wind energy installation of claim 3, wherein the rotation-speed modification element is configured to interact with a frequency limiter, to whose input signals for a maximum permissible frequency a normal frequency and the actual frequency are applied.

5. The wind energy installation of claim 1, wherein the classifier is designed such that the frequency-adaptive torque limiter is inactive when there is a discrepancy within a tolerance band.

6. A method for operating a wind energy installation having a wind rotor, a doubly-fed asynchronous generator driven by the wind rotor, a converter, a controller, and signal lines connecting the controller with the rotor, the generator, and the converter such that the controller controls the rotor, the generator, and the converter, wherein the generator is configured to interact with the converter, wherein an operating torque is determined in order to control the wind energy installation at an operating rotation-speed, the operating torque not exceeding a maximum torque, and wherein a grid frequency is determined, the method comprising:
   determining a frequency discrepancy;
   classifying the frequency discrepancy as an overfrequency or an underfrequency;
   reducing a maximum torque as a function of the frequency discrepancy, with this reduction being suppressed at an underfrequency; and
   limiting the rotation-speed as a function of the frequency discrepancy such that, when an over-frequency occurs, only the lower limit rotation-speed of the rotor is raised and, when an underfrequency occurs, only the upper limit rotation-speed of the rotor is reduced, the rotation-speed being raised and lowered, respectively, via the signal lines.

7. A method for operating a wind energy installation having a wind rotor, a doubly-fed asynchronous generator driven by the wind rotor, a converter, a controller, and signal lines connecting the controller with the rotor, the generator, and the converter such that the controller controls the rotor, the generator, and the converter, wherein the generator is configured to interact with the converter, wherein an operating torque is determined in order to control the wind energy installation at an operating rotation-speed, the operating torque not exceeding a maximum torque, and wherein a grid frequency is determined, the method comprising:
   determining a frequency discrepancy;
   classifying the frequency discrepancy as an overfrequency or an underfrequency;
   reducing a maximum torque as a function of the frequency discrepancy, with this reduction being suppressed at an underfrequency; and
   limiting the rotation-speed as a function of the frequency discrepancy such that, when an over-frequency occurs, only the lower limit rotation-speed of the rotor is raised and, when an underfrequency occurs, only the upper limit rotation-speed of the rotor is reduced, the rotation-speed being raised and lowered, respectively, via the signal lines,
   wherein the frequency-adaptive torque limiter of claim 1 is used.

* * * * *